US012680980B2

(12) United States Patent
Trachy-Cloutier et al.

(10) Patent No.: US 12,680,980 B2
(45) Date of Patent: Jul. 14, 2026

(54) ADAPTABLE APPARATUS FOR NON-DESTRUCTIVE INSPECTION

(71) Applicant: Evident Canada, Inc., Québec (CA)

(72) Inventors: Justin Trachy-Cloutier, Lévis (CA); Christian Gagnon-Lachance, Levis (CA)

(73) Assignee: Evident Canada, Inc., Québec (CA)

( * ) Notice: Subject to any disclaimer, the term of this patent is extended or adjusted under 35 U.S.C. 154(b) by 261 days.

(21) Appl. No.: 18/546,469

(22) PCT Filed: Mar. 3, 2022

(86) PCT No.: PCT/CA2022/050299
§ 371 (c)(1),
(2) Date: Aug. 15, 2023

(87) PCT Pub. No.: WO2022/183290
PCT Pub. Date: Sep. 9, 2022

(65) Prior Publication Data
US 2024/0302324 A1 Sep. 12, 2024

Related U.S. Application Data

(60) Provisional application No. 63/203,166, filed on Jul. 12, 2021, provisional application No. 63/200,514, (Continued)

(51) Int. Cl.
*G01N 27/9093* (2021.01)
*G01N 27/9013* (2021.01)
(Continued)

(52) U.S. Cl.
CPC ....... *G01N 27/9093* (2013.01); *G01N 27/902* (2013.01); *G01N 27/9026* (2013.01); (Continued)

(58) Field of Classification Search
CPC ............. G01N 27/9093; G01N 27/902; G01N 27/9026; G01N 29/043; G01N 29/225; (Continued)

(56) References Cited

U.S. PATENT DOCUMENTS 8,798,940 B2 * 8/2014 Imbert ................. G01N 29/275
702/35
9,395,339 B2 7/2016 Sarr et al.
(Continued)

FOREIGN PATENT DOCUMENTS

JP 2019060888 4/2019
WO WO-2022183290 A1 9/2022

OTHER PUBLICATIONS

"Japanese Application Serial No. 2023-553691, Notification of Reasons for Rejection mailed Nov. 5, 2024", W English Translation, 8 pgs.
"Canadian Application Serial No. 3,212,527, Examiners Rule 86(2) Report mailed Nov. 26, 2024", 5 pgs.
"European Application Serial No. 22762292.5, Extended European Search Report mailed Jan. 9, 2025", 8 pgs.
(Continued)

*Primary Examiner* — Tarun Sinha
(74) *Attorney, Agent, or Firm* — K&L Gates LLP

(57) ABSTRACT

Non-destructive testing of an elongate object can include using an adaptable apparatus to support objects having different cross-sectional profiles. For example, an adaptable inspection fixture can support inspection probes for acoustic or eddy current inspection, as illustrative examples. Generally, the apparatus comprises opposing portions which are pivotable and connected by a linkage to maintain the opposing portions in a specified orientation relative to each other while permitting independent rotational orientations of each respective opposing portion such as to accommodate test objects. For example, the opposing portions can be substantially parallel across multiple configurations. Optionally, the apparatus can maintain a specified orientation of one or more radius probes with respect to an object under test.

17 Claims, 13 Drawing Sheets

Related U.S. Application Data filed on Mar. 11, 2021, provisional application No. 63/200,424, filed on Mar. 5, 2021.

(51) Int. Cl.

| | |
|---|---|
| *G01N 29/04* | (2006.01) |
| *G01N 29/22* | (2006.01) |
| *G01N 29/265* | (2006.01) |
| *G01N 29/27* | (2006.01) |

(52) U.S. Cl.
CPC ......... *G01N 29/043* (2013.01); *G01N 29/225* (2013.01); *G01N 29/265* (2013.01); *G01N 29/27* (2013.01); *G01N 2291/2626* (2013.01)

(58) Field of Classification Search
CPC ................ G01N 29/265; G01N 29/27; G01N 2291/2626; G01N 27/9013
See application file for complete search history.

(56) References Cited

U.S. PATENT DOCUMENTS

| | | | |
|---|---|---|---|
| 10,782,267 B1 * | 9/2020 | Alrowaeyh | .............. B25J 9/162 |
| 2011/0025316 A1 | 2/2011 | Faucher et al. | |
| 2017/0059531 A1 | 3/2017 | Fetzer et al. | |
| 2020/0264138 A1 | 8/2020 | Chevalier et al. | |

OTHER PUBLICATIONS

"Canadian Application Serial No. 3,212,527, Response filed Mar. 26, 2025 to Examiners Rule 86(2) Report mailed Nov. 26, 2024", 20 pgs.

"International Application Serial No. PCT/CA2022/050299, International Search Report mailed Jun. 7, 2022", 3 pgs.

"International Application Serial No. PCT/CA2022/050299, Written Opinion mailed Jun. 7, 2022", 5 pgs.

* cited by examiner

ADAPTABLE APPARATUS FOR NON-DESTRUCTIVE INSPECTION

CLAIM OF PRIORITY

This application is a U.S. national stage filing under 35 U.S.C. § 371 from International Application No. PCT/CA2022/050299, filed on Mar. 3, 2022, which claims priority to U.S. provisional Applications Ser. No. 63/200,424, filed on Mar. 5, 2021, Ser. No. 63/200,514, filed on Mar. 11, 2021, and Ser. No. 63/203,166, filed on Jul. 12, 2021, which are incorporated by reference herein in their entireties, and the benefit of priority of each of which is claimed herein.

TECHNICAL FIELD

This document pertains generally, but not by way of limitation, to apparatus and techniques for non-destructive inspection such as facilitating eddy-current or acoustic inspection. More particularly, it relates to mechanical fixturing that is adaptable to different material profiles, such as comprising "L" shaped, "T" shaped, or "U" shaped profiles of an object to be inspected.

BACKGROUND

Non-destructive testing or non-destructive inspection (NDT/NDI) can be used to test an object for anomalies, such as to ensure structural integrity or to verify other characteristics such as physical dimensions, without causing damage to the object. NDT can be used to analyze a fabricated part such as to detect flaws or features on or within the object. Depending on the inspection technology, structures made of various materials can be inspected using an NDT approach. Such objects can include fiber composite structures or metallic structures such as aluminum components, for example. NDT can be used in manufacturing processes where destructive testing would be infeasible or cost prohibitive. NDT can also be used to provide field inspection or ongoing monitoring. In certain NDT systems, probes can be placed in proximity to an object to perform inspection. As an illustration, for some elongate test objects, the probes may survey the object along its length by moving either the object or the probe assembly, such as in order to provide inspection along a portion or an entirety of the longitudinal extent. In another example, fixturing can be used to move the object or probe in a manner providing circumferential coverage.

One approach for NDT can include or use an eddy-current testing technique where electromagnetic energy is applied by one or more probes to the test object and resulting induced currents on or within the object are detected, with the values of a detected current (or a related impedance) providing an indication of the structure of the object under test, such as to indicate a presence of a crack, void, porosity, or other inhomogeneity. Another approach for NDT can include or use of an acoustic inspection technique, such as where one or more probes containing electroacoustic transducers are used to insonify a region on or within the object under test, and acoustic energy that is scattered or reflected can be detected and processed. Such scattered or reflected energy can be referred to as an acoustic echo signal. Generally, such an acoustic inspection scheme involves use of acoustic frequencies in an ultrasonic range of frequencies, such as including pulses having energy in a specified range that can include value from, for example, a few hundred kilohertz, to tens of megahertz, as an illustrative example.

SUMMARY

The present subject matter generally involves apparatus and techniques that can facilitate, such as involving eddy-current, or acoustic inspection techniques. For example, an acoustic technique can include use of phased-array (PA) or single element acoustic transducer structures. Acoustic inspection may employ a couplant to facilitate coupling of acoustic energy between a transducer and an object under test. In one approach, an ultrasonic coupling medium, such as water, can be provided, such as in a laminar fashion interposed between a surface of a probe and a test object. In another approach, an acoustic coupling medium can be provided by conducting inspection using a tank or reservoir housing a coupling medium. The probe heads and at least a portion of the test object can be submerged in the coupling medium.

As described herein, various configurations can be used to facilitate surface or volumetric inspection of test objects varying in one or more of length (e.g., longitudinal extent), lateral extent, or profile. Multiple probes can be provided, such as manually or automatically adjusted to provide inspection access to a portion of the object under test, such as via a passage defined by a fixture. An elongate test object can move relative to the passage (either by moving the object relative to the fixture, or vice versa, for example), such as to allow for inspection to occur continuously or at various discrete locations along the longitudinal extent of the object. As mentioned above, such an approach can be carried out by drawing the elongate test object through a stationary fixture or by drawing the fixture along the length of a stationary test object, or a combination of both. Information obtained from the probe can be received by a processor and analyzed to provide inspection results such as imaging, data indicative of dimensional characteristics, or other properties.

Manipulating an NDT inspection fixture, such as to translate the fixture relative to the test object during inspection, can enhance throughput or can provide an NDT inspection system having a reduced footprint as compared to other approaches. For instance, the NDT inspection fixture can function as an end effector of a robotic arm or gantry and can be moved along the elongate test object. Apparatus and techniques, such as shown and described herein, can provide such enhanced throughput at least in part by accommodating elongate test objects that can vary in size or shape by using an adaptable inspection configuration that can be robotically manipulated, such as reducing complexity of systems that may otherwise be used to guide, rotate, or position objects under test having different geometries.

The present inventors have recognized, among other things, that such an adaptable fixture is generally capable of accurately and efficiently inspecting test objects varying in profile, thickness, and material as well as objects having a non-uniform profile across their length. Further, the present inventors have recognized that such a fixture can include multiple NDT inspection probes, such as providing dynamic probe positioning to enhance throughput or otherwise enable inspection of a wide variety of test objects using as few as single probe fixture.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1A:
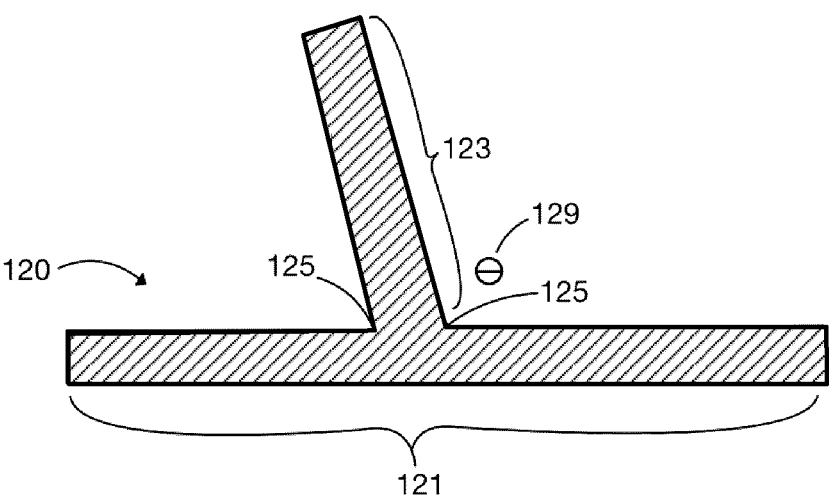
FIG. 1A shows a cross-section view of an illustrative example of a test object.

As described herein, non-destructive testing or non-destructive inspection (NDT/NDI) can use mechanical fixturing that is adaptable to different material profiles, such as supporting inspection of "L" shaped and "T" shaped, or "U" shaped profiles of an object to be inspected. NDT can be used to inspect an elongate structure. NDT analysis can be performed on objects during or after fabrication to ensure their quality by detecting imperfections. For example, NDT can be used to identify voids, cracks, foreign materials, separation, delamination, porosities, or other imperfections in a manufactured component.

In various settings, inspection of the elongate structure can include or use an eddy current technique (e.g., for conductive structures such as aluminum, or steel when above its Curie temperature, other structures). The eddy current technique can include or use an eddy current probe placed near the structure. In another approach, acoustic inspection can be used (e.g., for conductive or non-conductive bars or other structures). For example, the quality of a structure can be determined non-destructively by ultrasonic testing. An ultrasonic probe can be placed near the structure. The ultrasonic probe can contain a transducer which transmits pulsed ultrasonic waves which permeate the structure and receives scattered or reflected acoustic energy (or a separate receive probe can be used). In various NDT approaches, the transducer can be configured to provide plane wave or focused acoustic transmission, such as electronically scanned to provide various inspection angles or propagation modes.

Data obtained using ultrasonic testing can be processed and used to determine the presence of anomalies in the structure. For an elongate structure to be tested using ultrasonic probes, the ultrasonic probes can be passed along the elongate structure. Alternatively or additionally, the elongate structure can be passed along the ultrasonic probes. Multiple probes can be positioned at various locations relative to the profile of the structure for to account for potential blind spots of other probes or to otherwise enhance inspection coverage.

Generally, the probes, which can use ultrasonic waves, eddy currents, or other NDT techniques, can be oriented to provide a specified spatial or volumetric region of coverage and multiple probes can be used to contemporaneously inspect different regions of an object under test, such as to enhance throughput. Generally, ultrasonic analysis is conducted using a coupling medium between a transducer and a surface of the object under test. A liquid medium, such as water, can be used.

Generally, NDT probes can be arranged on a fixture attached to a manipulator, such as a robotic arm, a gantry, or a multi-axis scanner, or manipulated by hand. A challenge can exist for fixtures having a fixed configuration, because multiple different fixtures may be needed to accommodate differing angles, sizes, thicknesses, and other dimensions of elongate structures under test. A challenge may also be presented in inspecting an elongate structure with a non-uniform profile. For example, such a profile may require adjustment of the position and proximity of the probes as different regions of the elongate structure are inspected. Several passes along the length of the elongate structure may be required to achieve the targeted inspection coverage. The present inventors have recognized, among other things, that an adaptable fixture can be used, such as to accommodate various different elongate structures to support NDT inspection.

Figure 1B:
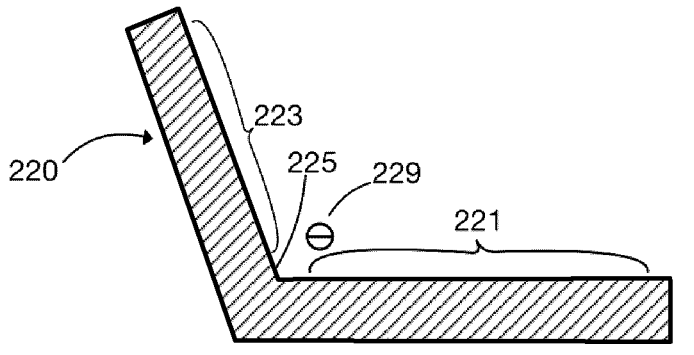
FIG. 1B shows a cross-section view of an illustrative example of a test object.
Figure 1C:
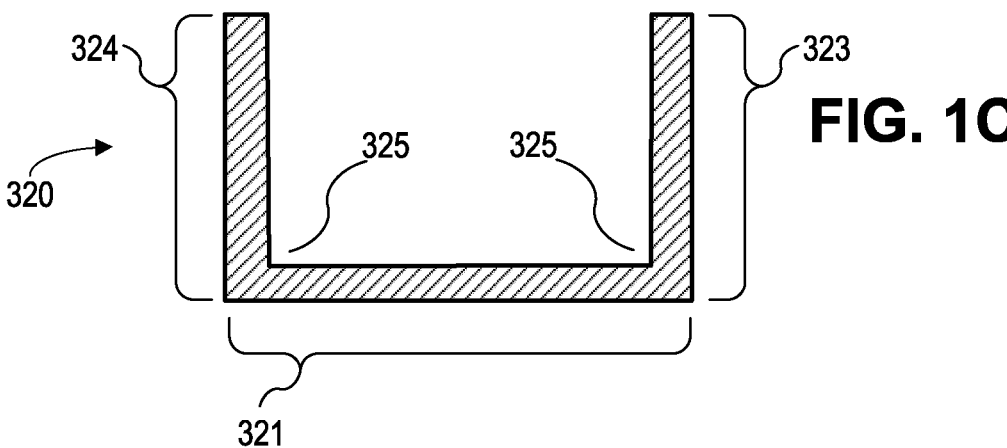
FIG. 1C shows a cross-section view of an illustrative example of a test object.

FIG. 1A shows an example of a cross-sectional profile of a "T" shaped test object. A T-shaped object 120 is referred to herein as such but throughout this disclosure can also include objects that are substantially T-shaped, such as Y-shaped, or objects that are partially T-shaped, such as cross-shaped or I-shaped. A T-shaped object can include or use a flange 121 which is intersected by a web 123. The flange 121, the web 123, or both can be parallel in shape (as shown) or can be tapered. The web 123 can protrude from the flange 121 at an angle 129 between nearly 0° to nearly 180°. The web 123 can protrude from the flange 121 at an angle 129 between 10° and 170°. The web 123 can protrude from the flange 121 at an angle 129 between 45° and 135°. The web 123 can be attached to the flange 121 at a first radius 125, a second radius 127, or both. While described and depicted herein as radii, one or more of joint 125 and joint 127 can be also substantially radius shaped and can be the concave or convex throats of welds or other bonds. FIG. 1B and FIG. 1C depict examples of other shapes of test objects, such as "L" shaped or "U" shaped. An L-shaped object 220 or U-shaped object 320 can be identical in most respects to the T-shaped object 120, but with differing placement of the web 123. An L-shaped object 220 is referred to herein as such but throughout this disclosure can also include objects that are substantially L-shaped or objects that are partially L-shaped.

The L-shaped object 220 can have a web 223 that is at or near an end of a flange 221. Web 223 can protrude from the flange 221 at a variety of different angles 229, similar to that of web 123 with respect to flange 121. The U-shaped object 320 can have more than one web. For example, a first web 323, a second web 324, or both can be at or near an end of a flange 321. While depicted herein as inner radii, joints 325 & 327 can also refer to outer connection points, such as outer welds or other outer bonds. While this disclosure can generically refer to a test object 120 and its aspects, it can be understood by one skilled in the art that any of the above-described test objects can also apply throughout; not only the T-shaped test object 120 of FIG. 1A. The test object 120 can be an elongate structure. The test object 120 can be made of fiber composite material such as carbon fiber, KEVLAR, graphite-epoxy, fiberglass, or another composite. Alternatively or additionally, the test object 120 can be made of metal such as aluminum, steel, titanium, or other metal. While the cross-sectional examples herein depict the test object 120 as having constant profile, the test object 120 can alternatively have a profile that varies along the test object 120 length (e.g., along the test object 120 longitudinal extent). Likewise, the angle 129 of the web 123 can vary along the length of the test object 120. The device of the present disclosure can be capable of performing a full or substantially full volumetric inspection of the above test objects 120, such as performing a full volumetric inspection upon a single pass of the apparatus along the length of the test object 120.

Figure 2:
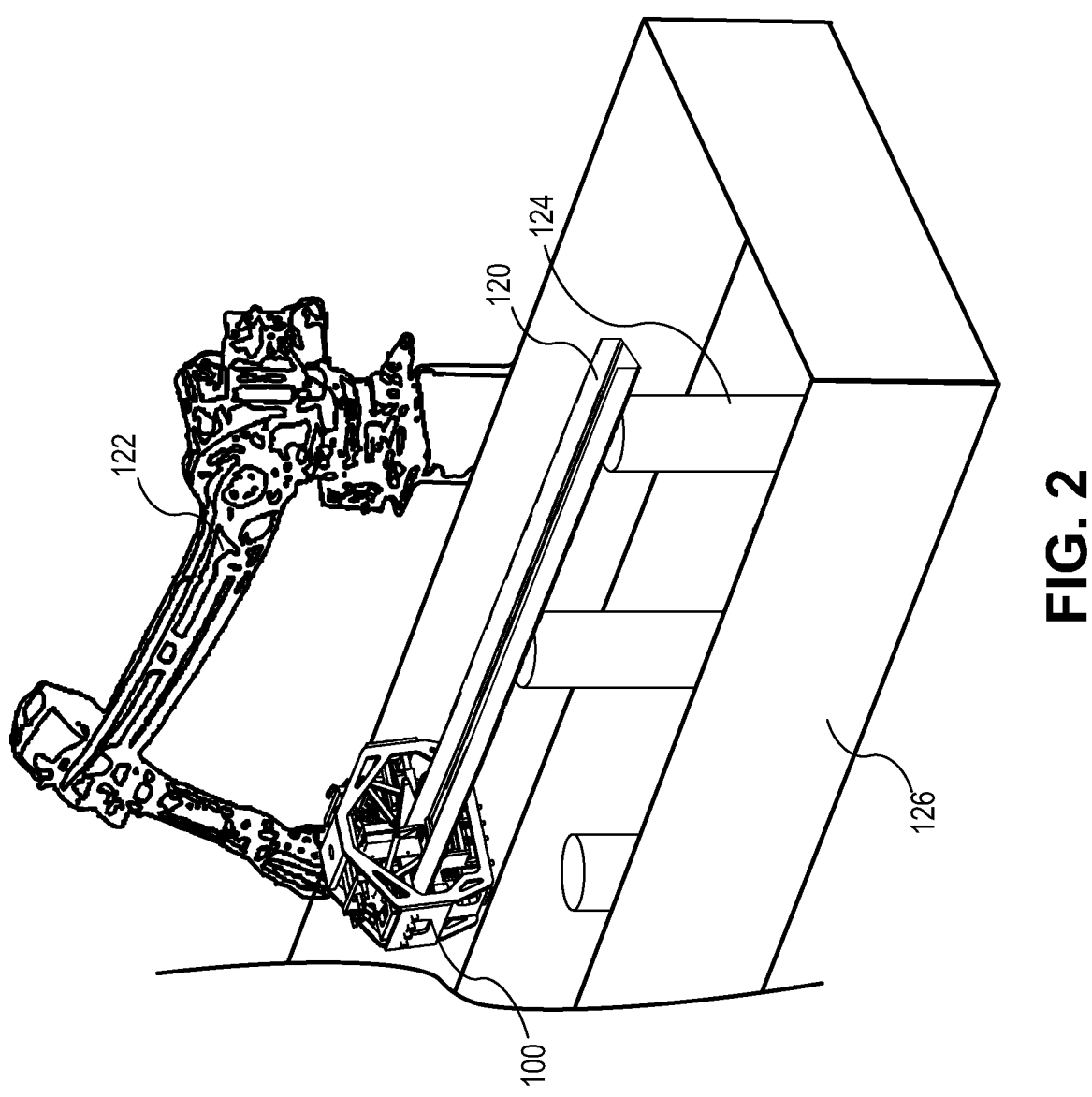
FIG. 2 shows a view of an NDT apparatus and object under test.
Figure 3:
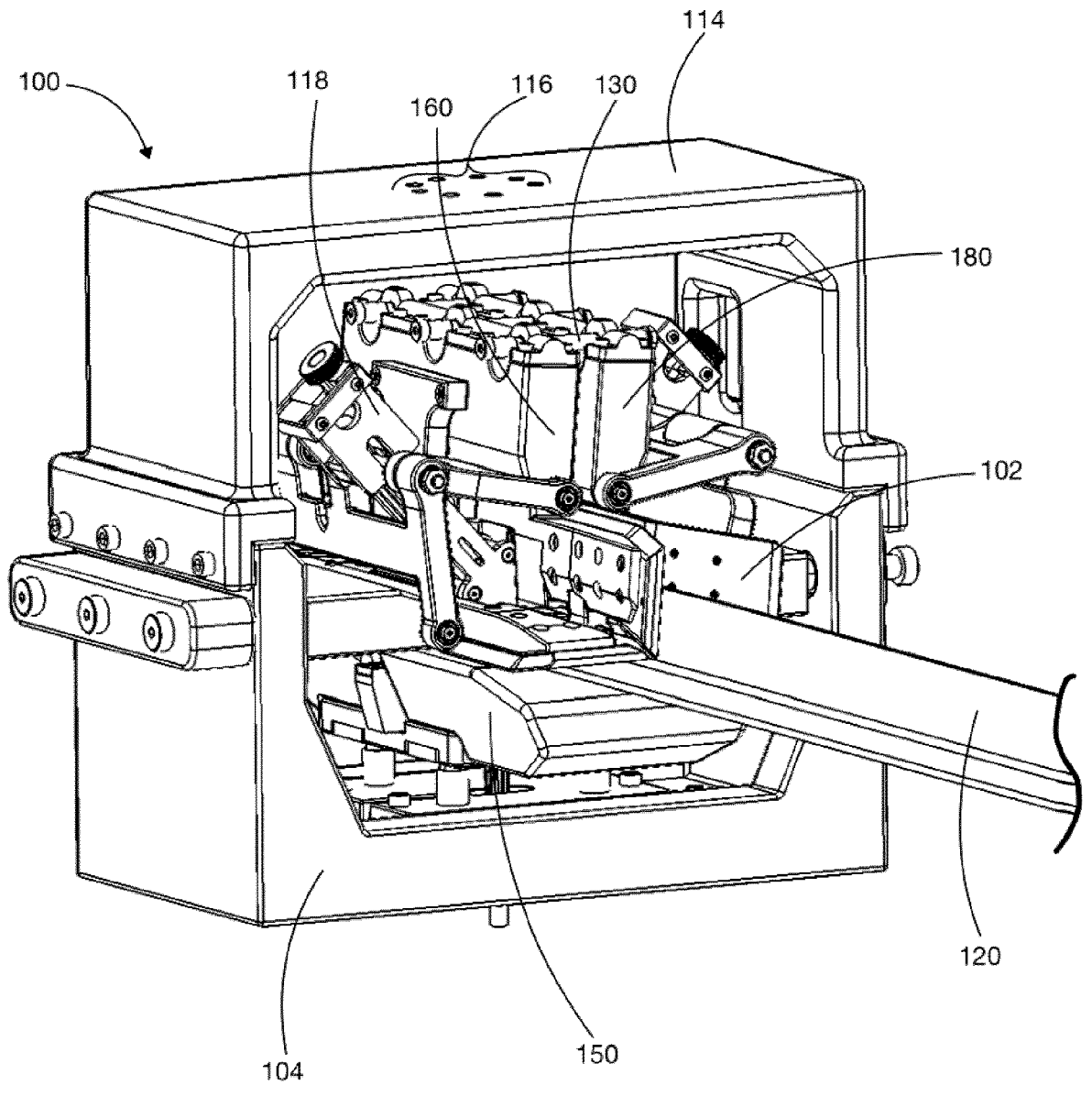
FIG. 3 shows a view of an inlet side of an NDT apparatus.

FIG. 2 shows a view of an example of an NDT apparatus in use. The apparatus 100 can be mounted to a manipulator 122 such as a robotic arm, a gantry, a multi-axis scanner, or other device suitable for manipulating an NDT apparatus. The manipulator 122 can function to rotate or translate the frame to position the first portion 160 and the second portion 180, as depicted in FIG. 3, relative to the object under test. In an example, the robotic arm can be mounted on rails to further permit flexibility of manipulation of the apparatus 100. In an example, one or more linear variable differential transformers (LVDTs) can be used to provide feedback for dynamic control of movement of the manipulator 122 to accommodate changes in the contour, curvature, or shape of the test object 120 along its length. Other sensing devices for manipulator 122 positioning can be used, such as electro-mechanical or optomechanical sensors.

Several NDT techniques can be used with the apparatus 100 of the present disclosure. In an example of an NDT system, the apparatus 100 can include or use an eddy-current testing (ECT) approach. In ECT systems, one or more probes containing coil arrays can induce eddy currents in a conductive object under test, and sense a resulting electromagnetic field associated with such eddy currents. The sensing component of the probe can measure the effective impedance or other electrical parameter associated with the field at one or more regions in order to identify inhomogeneities, such as imperfections or defects on or within the test object 120.

In an example, two or more eddy-current (EC) sensing regions overlap, such as oriented to intersect at midpoints thereof to increase sensitivity for imperfections and decrease sensitivity for changes in conductivity, permeability, irregular surface finishes, or other incidental irregularities. An illustrative example of an EC sensor is described in U.S. Pat. No. 8,816,680B2, filed on Aug. 23, 2013, and titled Eddy Current Array Configuration with Reduced Length and Thickness, which is incorporated by reference herein in its entirety, including for its teaching of a coil array for analyzing two-dimensional or three-dimensional objects, which can be used in combination with the NDT apparatus described in the present disclosure. One or more EC probes can be passed along the length of the test object 120 and signals received by the probes can be passed to a processor for analysis. The orientation of EC probes and their proximity to the test object 120 may generally impact sensitivity of the analysis. ECT can be used alone for analysis of the test object or can be combined with other methods of testing, such as ultrasonic testing.

Another example of an NDT system can include or use an acoustic inspection technique, such as where one or more probes containing electroacoustic transducers are used to propagate acoustic waves in the test object 120, and acoustic energy that is scattered or reflected can be detected and sent to a processor for analysis. In an example, the acoustic inspection probes can be ultrasonic (UT) probes. UT probes can include or use a transducer capable of sending and receiving pulsed waves. Ultrasonic waves that are reflected off the test object 120 can be processed can be interpreted based on signal amplitude and arrival time of the reflection in order to detect imperfections in the test object 120 or to provide dimensional information or to characterize material properties of the test object 120. Alternatively or additionally, the UT probes can include or use a transmitter to send ultrasonic waves (ultrasound) through one surface, and a separate receiver can detect the amount that has traveled through the test object 120. Imperfections between the transmitter and receiver can be identified such as by analyzing characteristics of scattered or reflected acoustic energy. In an example of NDT using UT probes, the UT probes can emit ultrasound in a phased array.

Phased array ultrasonic testing (PAUT) probes generally include several piezoelectric transducers that may be driven to transmit or coupled to receive acoustic signals. To focus the ultrasonic beam, time delays (or corresponding phase shifts) can be applied signals used to drive the elements to establish a specified acoustic profile, such as allowing the energy to be focused to a point or plane at or near a controlled depth in the test specimen undergoing inspection or to otherwise provide specified angular or spatial inspection coverage. Phased Array (PA) probes can be utilized in NDT to minimize the mechanical displacement required of the probe to perform adequate analysis. In an example, a single PA probe can provide a transducer capable of inspecting the test object 120 at multiple incident angles. A UT system which employs PA probes can provide efficient volumetric analysis of the test object 120 or can reduce inspection times by using electronic steering or beamforming approaches, or other techniques such as full-matrix capture with a Total Focusing Method (TFM) technique.

UT probes can be used to analyze the test object with a coupling medium in order to reduce irrelevant losses in ultrasonic energy and to increase the sensitivity of the UT probes in detection of imperfections. A test object 120 can be submerged in a large tank 126 of coupling medium or couplant and the manipulator 122 can function to pass the apparatus 100 along the length of the test object 120. As such, the apparatus 100 can be submersible within the couplant. Also, the apparatus can have the coupling medium sprayed near the probes in the apparatus by internal circulation or can be sealed such as to retain the medium inside the apparatus. The couplant can be water, oil, grease, glycerin, a liquid polymer, or other couplant to help facilitate the transmission of acoustic energy to and from the probes. The tank 126 can include or use an irrigation system or a squirter to supply or circulate the couplant. The tank 126 can also include or use retractable supports 124 which can function to secure the test object 120, such as to hold the test object 120 by vacuum pressure.

The retractable supports 124 can function to retract to allow the apparatus 100 to pass along the length of the test object 120 and can return to secure the test object once the apparatus 100 has passed the location of the particular support 124. Multiple supports can be used to maintain support of the test object 120 in a stationary position while still allowing the apparatus to pass around the object 120 along its complete length. Alternatively, the test object 120 can be secured in the tank 126 by another method, such as secured by anchoring one end of the object 120 to a component of the tank 126. In an example, the coupling medium can be supplied to the test object and probes with another source of fluid communication other than a tank 126, such as fluid communication supplied by hoses, outlets, or inlets.

Generally, inspection probes can relay information (e.g., be controlled by or be communicatively coupled) to one or more test processing units. The test processing unit can enable the controlled scanning of the test object 120, such as providing motion control of the apparatus 100 along the length of the test object 120. The test processing unit can be communicatively coupled with the probe. The test processing unit can include or use data acquisition unit (DAU). The test processing unit can include or use a memory circuit which can include or use instructions that, when executed by the processing unit, can cause the processing unit to perform an inspection operation using at least one probe. The test processing unit can provide inspection control, logging, or related imaging, such as providing A-scan, B-scan, C-scan, and D-scan representations of acquired acoustic data.

Figure 4:
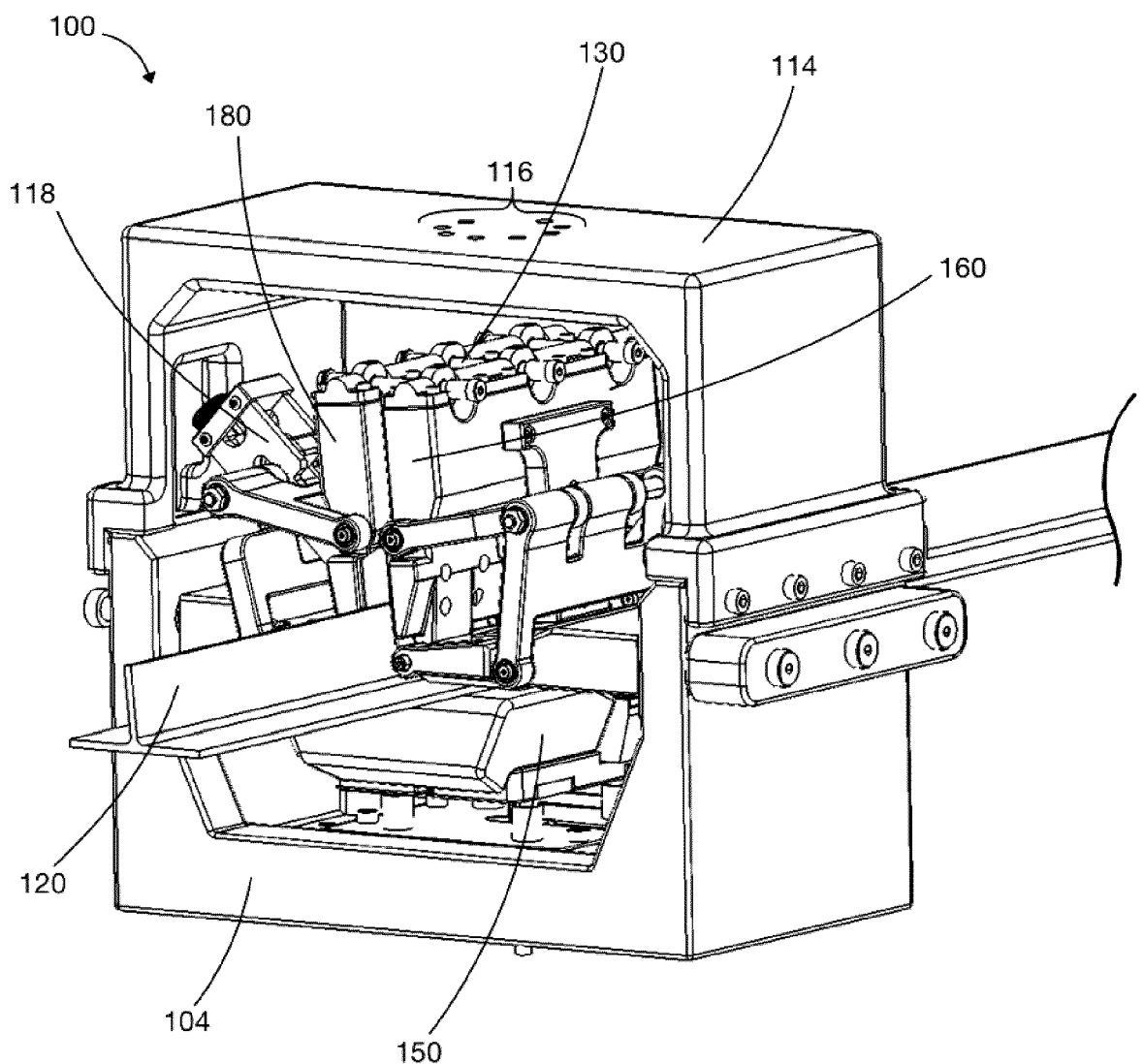
FIG. 4 shows a view of a non-inlet side of an NDT apparatus.

FIG. 3 and FIG. 4 show views of an example of an NDT apparatus 100. Referring to FIG. 3 and FIG. 4, for example, the apparatus 100 can adapt mechanically for use with different cross-sectional profiles of an object under test. The apparatus 100 can include or use a frame 104, an inlet feature 102, a first portion 160, a second portion 180, a linkage 130, one or more inspection probes 118, and a third portion 150. The frame 104 can include or use an enclosure 114 and can house several components of the apparatus 100. The enclosure 114, the frame 104, or both can include one or more apertures such as to avoid interference with one of the several components of the apparatus 100, such as interference with one of the inspection probes 118. The apparatus 100 can be moved along a test object 120 to for non-destructive inspection of the test object 120. In an example, the apparatus 100 can be mountable to the manipulator 122 by a mating feature 116. In another example, the test object 120 can be moved or fed through the apparatus 100.

Figure 5:
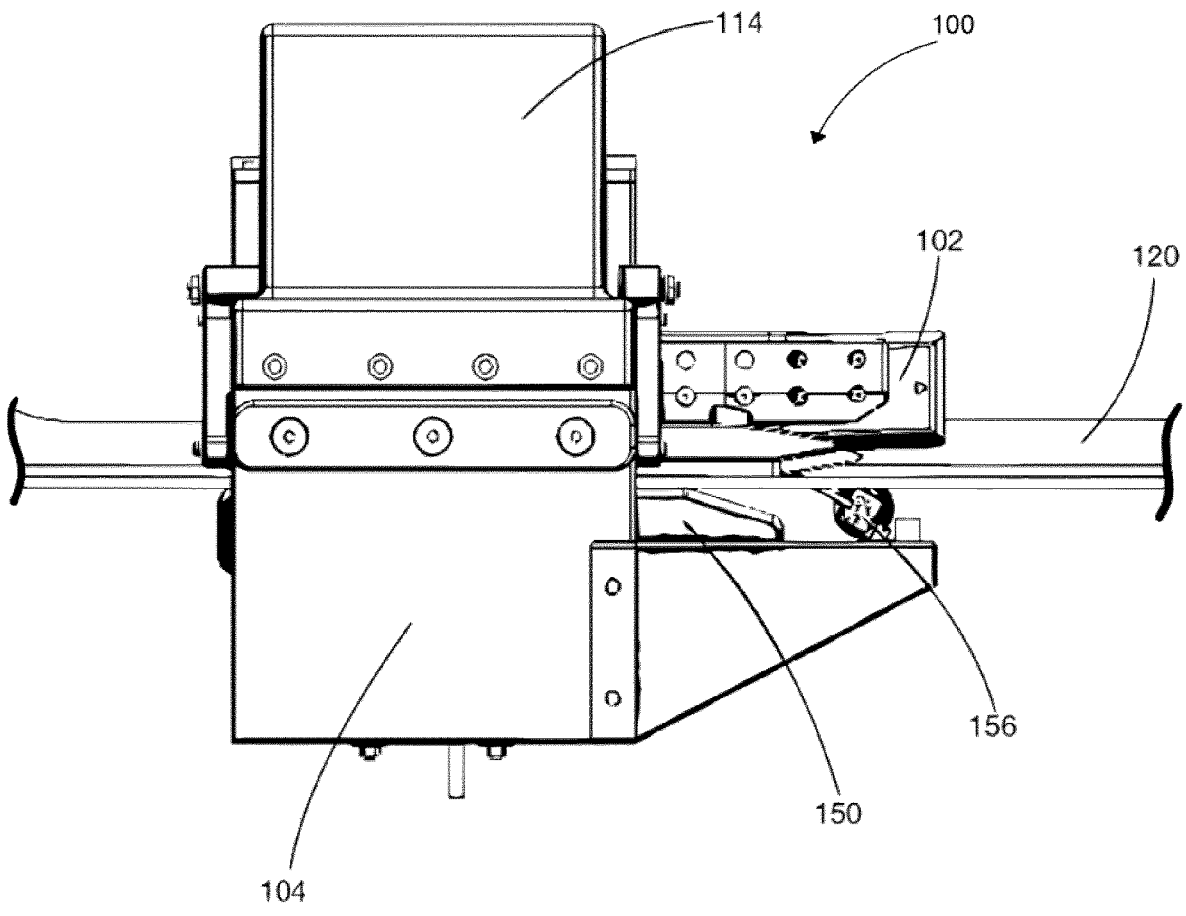
FIG. 5 shows a side view of an NDT apparatus.

FIG. 5 shows a side view of an example of an NDT apparatus. A test object 120 can be scanned as the test object 120 is translated longitudinally (e.g., in a right-to-left in the view of FIG. 5) relative to the apparatus 100 for surface or volumetric inspection (or both). The apparatus can include or use one or more inlet features 102 (e.g., similar to inlet feature 102). The inlet feature 102 can be tapered. The inlet feature 102 can be sized, shaped, and oriented to accept test objects 120 varying in profile geometry, thickness, height, bend, and other dimensions. The inlet feature 102 can be sized, shaped, and oriented to guide the test object 120 into the apparatus 100, such as to guide the test object 120 toward a location between the first opposing surface 162 and the second opposing surface 182. Similarly, the third portion 150 can be tapered to accept and guide test objects 120. The inlet feature 102 or tapered end of the third portion 150 can be included on one side of the apparatus 100 and defining a leading side of the apparatus 100 such as to accept or guide the test object 120 upon insertion, as depicted on the right side of the example of FIG. 5. The inlet feature 102 can accept a force applied thereupon by the test object 120 upon insertion such as to displace the inlet feature 102 in order to conform to the profile of the test object 120. The inlet feature 102 or tapered end of the third portion 150 can be included both sides of the apparatus 100 such as to allow the object under test to be inserted into either side of the apparatus 100. The inlet features 102 can be used as a portion of an inlet guide, such as multiple inlet features 102 corresponding to the first opposing surface 162 and the second opposing surface 182, respectively. In one example, the NDT apparatus 100 can include or use an encoder 156 such as to collect position data of the test object 120, the NDT apparatus 100, or both. Alternatively or additionally, the NDT apparatus 100 can use an encoder located at or near or connected to the manipulator 122.

Figure 6:
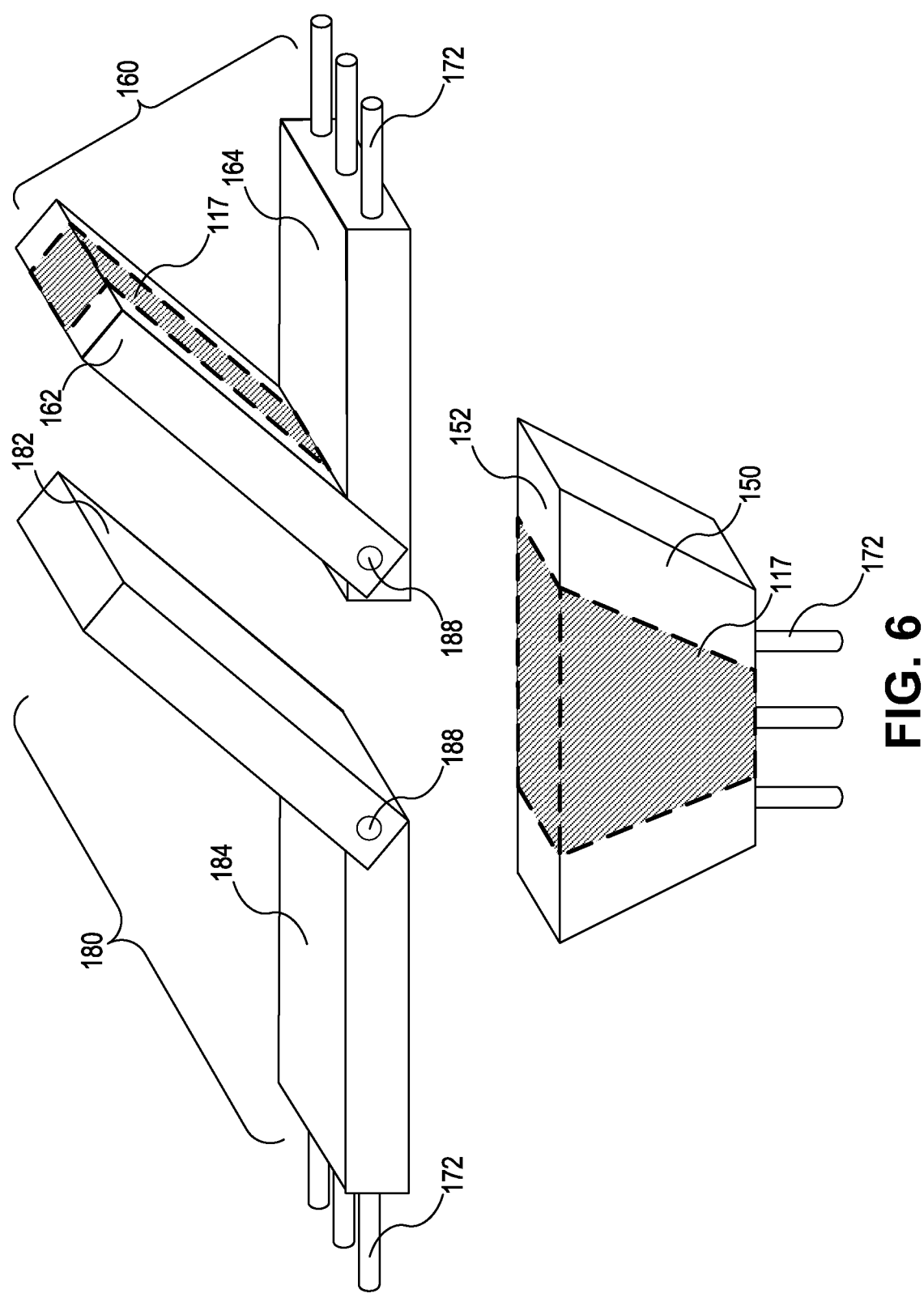
FIG. 6 shows an exploded view of a part of an NDT apparatus.

FIG. 6 shows an exploded view of a part of an example of an NDT apparatus. The apparatus 100 can include or use the first portion 160, the second portion 180 and the third portion 150. The first portion 160 can include or use a first opposing surface 162, and the second portion 180 can include or use a second opposing surface 182. The first portion 160 and second portion 180 can be mechanically coupled to the frame at one or more junctions 172 (e.g., a frame 104 as discussed above). In an example, the junctions 172 can be pins or threaded structures sized and shaped to extend through apertures of the frame 104. The junctions 172 can include or use springs. In another example, the junctions 172 can be coupled with or can include piston structures (e.g. hydraulic or pneumatic devices) or electromechanical actuators for translating one or both of the first portion 160 and the second portion 180 towards and away from the frame 104. Other methods of mechanical coupling can be used to pair both the first portion 160 and second portion 180 to the frame 104. In another example, at least one of the junctions can be a slide such as to allow for the first portion 160, the second portion 180, or both to translate towards and away from the frame 104. The first opposing surface 162 can be pivotably connected to the first portion 160, such as can be pivotably connected to a first portion shelf 164 about a reference location 168. The second opposing surface 182 can be pivotably connected to the second portion 180, such as can be pivotably connected to a first portion shelf 184 about an adherence location 188. In an example, the first portion 160, the second portion 180, or both can be shaped as foldable brackets. The first portion 160, the second portion 180, or both can include or use or be mechanically coupled to one or more surface probes 117.

The apparatus 100 can also include or use the third portion 150 defining a third surface 152. In an example, the third portion 150 can function as a support platform to raise or hold the test object 120. In a similar fashion to the first portion 160 and second portion 180, the third portion 150 can be mechanically coupled to the frame 104 at one or more junctions 172. In an example, the junctions 172 can be pins sized and shaped to extend through apertures of the frame 104. In another example, the junctions 172 can be hydraulic pistons or electric motors capable of translating the third portion 150 towards and away from the frame 104. Other methods of mechanical coupling can be used to pair the third portion 150 to the frame 104. In another example, at least one of the junctions can be a slide such as to allow for the third portion 150 to translate towards and away from the frame 104. In an example, the third portion 150 can be mechanically coupled to the frame such that the third surface 152 is substantially perpendicular to the first portion shelf 164 and the second portion shelf 184. Additionally, the third portion 150 can include or use or be mechanically coupled to one or more surface probes 117. The surface probe 117 located at or near the third portion can be at least partially housed by the third portion 150, as depicted in FIG. 6, or can span a width greater than that of the 150.

Figure 7:
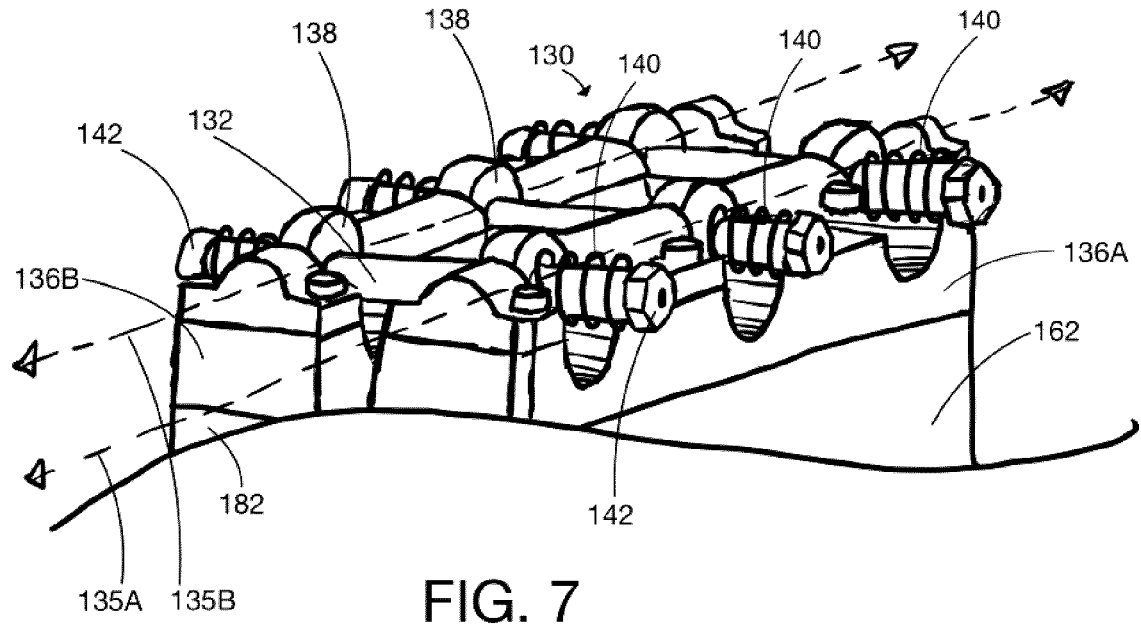
FIG. 7 shows a view of a part of an NDT apparatus.

FIG. 7 shows an isolated view of the linkage in an example of an NDT apparatus. In some examples, first portion 160 and the second portion 180 can be mechanically coupled by a linkage 130. In an example, the linkage 130 can couple the first opposing surface 162 with the second opposing surface 182. The linkage 130 can maintain a specified rotational orientation of the second opposing surface 182 relative to the first opposing surface 162 as the first opposing surface pivots about the adherence location 188. Also, the linkage 130 can permit independent rotational orientations of the first opposing surface 162 and the second opposing surface 182 such as to accommodate test objects 120 having a web with non-parallel sides. The linkage 130 can include or use one or more linkage plates 136 and one or more slides 132. The linkage plates 136A & 136B can be mechanically coupled or anchored to the first portion 160, the second portion 180, or both. The linkage plates 136A & 136B can include or use springs. The slide 132 can be a shaft sized and shaped to extend through a linkage aperture 138. Alternatively or additionally, the one or more slides 132 can be mechanically coupled or anchored directly to either or both of the first portion 160 and second portion 180. The slide 132 can include or use springs. In another example, the shaft can include or use hydraulic pistons or electric motors. The one or more slides 132 can define a lateral translational axis of the linkage 130. Additionally, the one or more slides 132 can permit translation of the first portion 160 relative to the second portion 180 along the lateral translational axis. The linkage 130 can mechanically couple the first opposing surface 162 and second opposing surface 182 to allow them to rotate and slide with respect to each other while still permitting independent rotational orientations of each of the opposing surfaces 162 and 182. In an example of an NDT apparatus 100, the linkage aperture 138 can be an aperture of a bearing structure such as a pillow block or eyelet supporting a slide 132. The pillow block or eyelet including the linkage aperture 138 can be rotatable about a superior axis 135A or a superior axis 135B and can be attached to the linkage plate 136A or linkage plate 136B. The pillow block or eyelet can also be rotatable about superior axis 135A or superior axis 135B and can be attached directly to one or both of the first opposing surface 162 and the second opposing surface 182. For instance, as shown on the left of FIG. 7, the second opposing portion 182 can be attached to the linkage plate 136B, and the linkage plate 136B can be attached to the linkage aperture 138. Here, the linkage plate 136B can enable the pillow block or eyelet including linkage aperture 138 to rotate about the superior axis 135B. A similar configuration can exist regarding the first opposing portion 162, the linkage plate 136A, and the linkage aperture 138 with respect to the superior axis 135A. The slide 132 can extend through one or more of the linkage apertures 138. In an example of the linkage 130, each of the first opposing surface 162 and the second opposing surface 182 can include or use at or near its superior axis one or more linkage apertures 138. One or more slides 132 can extend through one or more pairs of linkage apertures 138, such as one end of the slide 132 extending through an aperture 138 at or near the first opposing surface 162 and an opposite end of the slide 132 extending through an aperture 138 at or near the second opposing surface 182. A slide fastening 142 can be fixed at one or both ends of the slide 132. The linkage 130 can be biased or partially biased such as to force the first opposing surface 162 and the second opposing surface 182 towards a medial plane between the two. In an example, one or more springs 140 located between the linkage aperture 138 and the slide fastening 142. Also, one or more springs can be located at or near the shaft 132 between the linkage apertures 138 of each of the first and second opposing surfaces 162 and 182. Other similar methods of biasing can be used such as to force the first opposing surface 162 and the second opposing surface 182 towards the medial plane between the two. Other similar methods of biasing can be used such as to force the first opposing surface 162 towards the second opposing surface 182, the second opposing surface 182 towards the first opposing surface 162, or both opposing surfaces 162 and 182 towards one another.

Alternatively, as can be see with respect to FIG. 6, the first portion 160 and the second portion 180 can operate without the need for the linkage 130 connecting the first opposing surface 162 and the second opposing surface 182. In such examples, the first opposing surface 162 and second opposing surface 182 can be rotationally biased such that the first and second opposing surfaces 162 and 182 can be loaded to rotate towards a medial plane between the two. In some examples, either or both of the first and second opposing surfaces 162 and 182 can include springs at or near points 168 and 188 which can function such as to cause the rotational bias.

Figure 8:
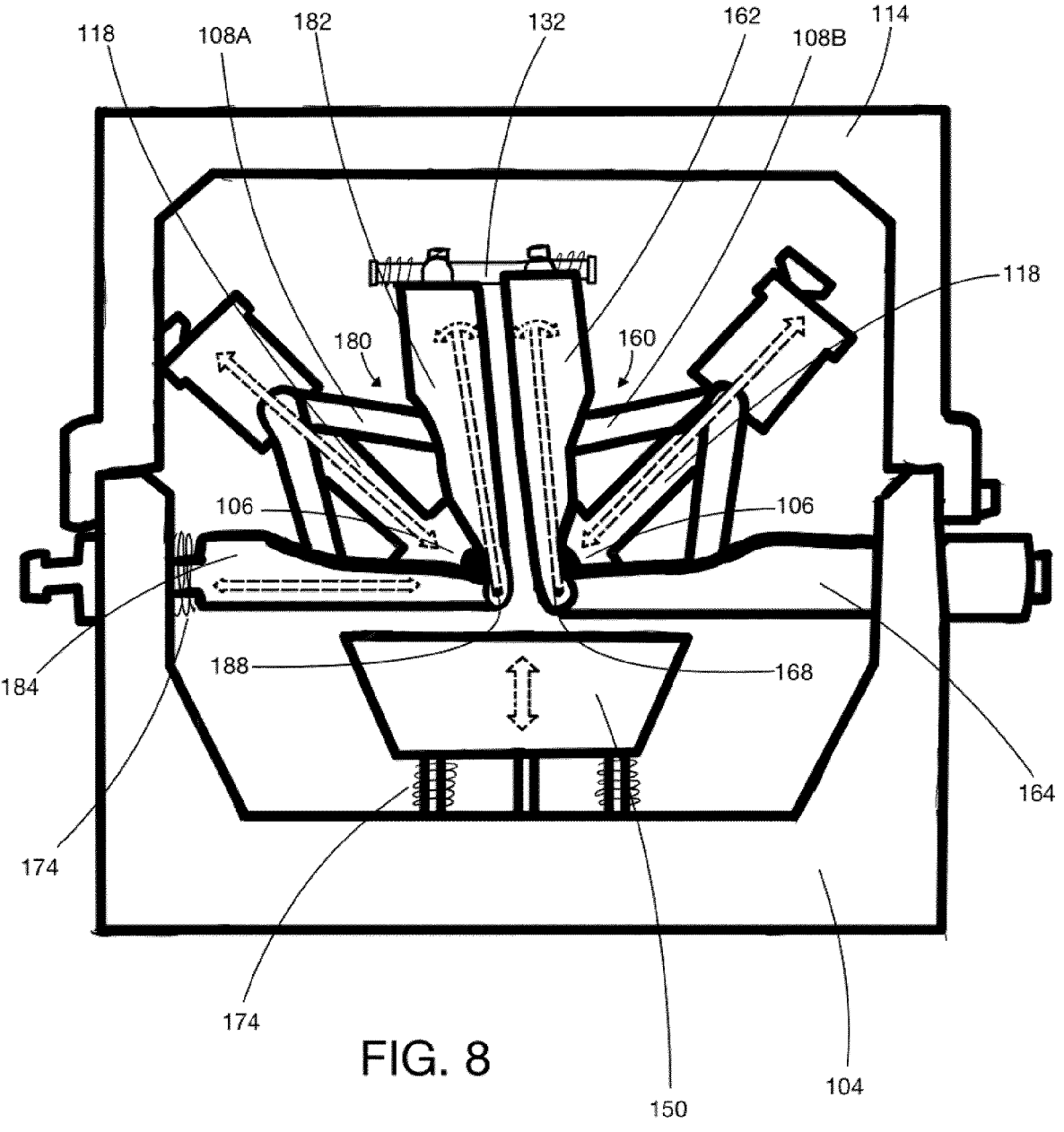
FIG. 8 shows a schematic representation of an NDT apparatus.

FIG. 8 shows a schematic representation of an example of an NDT apparatus. In an example, the apparatus 100 can include one or more inspection probes 118. The inspection probe 118 can be used for inspecting a radius or corner of an elongate surface, such as the radius or corner of a test object. A shoe 106 of the inspection probe 118 can be curved such as to provide targeted or focused coverage of an inside corner of the test object 120. The inspection probe 118 can be attached to the first portion 160, the second portion 180, or both by a support 108. The support 108 can be a scissoring support, such as a scissoring bracket including or using a first elongate member and a second elongate member each pivotably coupled to the first portion 160 or the second portion 180. The support 108 can permit translation of a rotational orientation for the first surface 160 to the inspection probe 118. As such, the support 108 can adjustably orient the probe 118 at a specified angle. Also, the support 108 can be attached to the first and second opposing portions 162 and 182 at either or both of points 168 and 188. For example, the specified angle can bisect the angle created by the first opposing portion 162 and the first portion shelf 164. Likewise, the support 108A or 108B can adjustably orient the probe 118 at a bisector of the angle created by the second opposing portion 182 and the second portion shelf 184.

As depicted in FIG. 8, several components of the apparatus 100 can be moveable relative to the frame 104. In one embodiment, the first portion 160 can pivot about the reference location 168 establishing a rotational orientation of the first opposing surface 162, such as to allow the surface 162 to conform to a cross-sectional profile of the test object 120. The support 108 can transfer the rotational orientation of the first opposing surface 162 to an inspection probe 118, such as to maintain a specified orientation of the probe 118. For example, an orientation can be maintained about a plane bisecting the angle between the first opposing surface 162 and the first portion shelf 164. The linkage 130 can transfer the rotational orientation of the first opposing surface 162 to a rotational orientation of the second opposing surface 182. The linkage 130 can hold the first opposing surface 162 and the second opposing surface 182 substantially parallel across a plurality of rotational orientations of the first opposing surface 162. Similar to the first portion 160, the support 108 can transfer the rotational orientation of the second opposing surface 182 to an inspection probe 118, such as to maintain a linear orientation of the probe 118 about a plane bisecting the angle between the second opposing surface 182 and the second portion shelf 184.

Alternatively or additionally, in an example the inspection probe 118 can pivot independently of the rotational orientation of the first portion 160 or the second portion 180, respectively. In several embodiments, the inspection probe 118 can be adjustable in its proximity to the test object 120, such as to have an adjustable distance between a transducer face and the test object 120. The inspection probe can be adjusted in such a manner manually or automatically via electric motors, pneumatic or hydraulic cylinders, or other suitable methods of actuation or mechanical movement. In an example utilizing UT, the inspection probes can be paired to a processor which implements a coherent adaptive focusing (CAF) technique to perform inspection of a surface having a curved or radiused profile, such as in an adaptive manner. In an example, the apparatus 100 can include or use an automatic weld-seam tracking capability. An illustrative example of an automatic weld seam tracking device is described in U.S. Pat. No. 8,365,602B2, filed on Oct. 9, 2009, and entitled Weld Seam Tracking System Using Phased Array Ultrasonic Devices, which is incorporated by reference herein in its entirety, including for its teaching of a weld seam tracking capabilities, which can be used in combination with the NDT apparatus described in the present disclosure.

In an example, the first portion 160, the second portion 180, or both can be translatable towards a medial plane of the apparatus 100 between the two. As depicted in FIG. 8, the second portion 180 can be translatable towards the medial plane, such as by the second shelf 184 which can be translatable away from the frame 104 and towards the medial plane. The second portion 180 can be biased towards the medial plane, such as biased by one or springs 174. In other words, the second opposing surface 182 can be biased towards the first opposing surface 162 to conform to opposite faces of a first planar region of the test object 120. The second portion 180 can be manually adjustable for translation towards the medial plane. Alternatively or additionally, the second portion 180 can be mechanically actuatable for translation towards the medial plane. In an example, the second portion 180 can be remotely actuatable. The first portion 160 could be translatable in a similar fashion to the second portion 180 as described above.

The third portion 150 can be oriented such that the third surface 152 is substantially perpendicular to the first portion shelf 164 and the second portion shelf 184. The third portion 150 can be biased in a direction towards the first portion 160 and the second portion 180 and away from the frame 104, such as biased by one or more springs 174. The third portion 150 can be manually adjustable for such translation towards. Alternatively or additionally, the third portion 150 can be mechanically actuatable for such translation. In an example, the third portion 150 can be remotely actuatable.

Figures 9A, 9B:
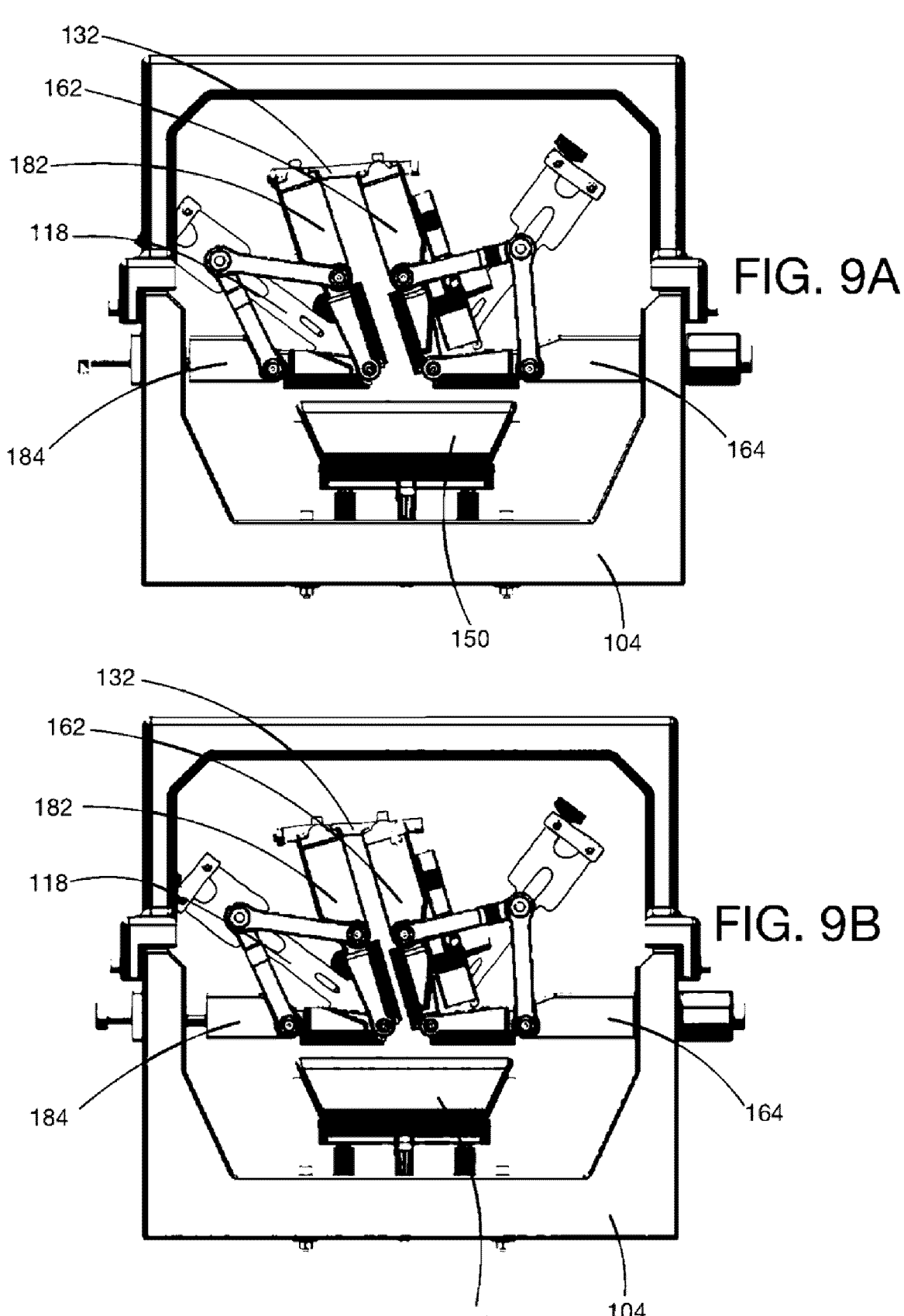
FIG. 9A shows an end view of an NDT apparatus in an expanded position.
FIG. 9B shows an end view of an NDT apparatus in a compressed position.

FIG. 9A and FIG. 9B show two dispositions of an example the apparatus 100 showing a way the second portion 180 can be translatable relative to the medial plane to accommodate various test objects 120. The apparatus 100 can be scalable to accommodate test objects 120 of a variety of different configurations and dimensions. As an illustrative (but non-restrictive) example, the test object 120 can have a thickness of about 1.5 millimeters (mm) to about 8.5 millimeters. The test object 120 can typically have a length of about 0.6 meters to about 20 meters long. The test object can typically have a height of about 25 mm to about 100 mm and a width of about 50 mm to about 115 mm. The radii 125 and 225 can each measure from about 4 mm to about 12 mm. As depicted in FIG. 9A, the apparatus 100 can be in a first wide position to accommodate test objects of greater thickness, such as a greater thickness of the web 123 of the test object 120. The apparatus can be adjustable to a first narrow position as depicted in FIG. 9B to accommodate test objects 120 of less thickness, such as a lesser thickness of the web 123. The apparatus 100 can be placed in a plurality of positions accommodating a plurality of web 123 thicknesses in addition to those depicted in FIG. 9A and FIG. 9B. The apparatus can be adjustable to accommodate a test object 120 with varying profile, dimensions, or both along the length of the test object 120.

Figures 10A, 10B:
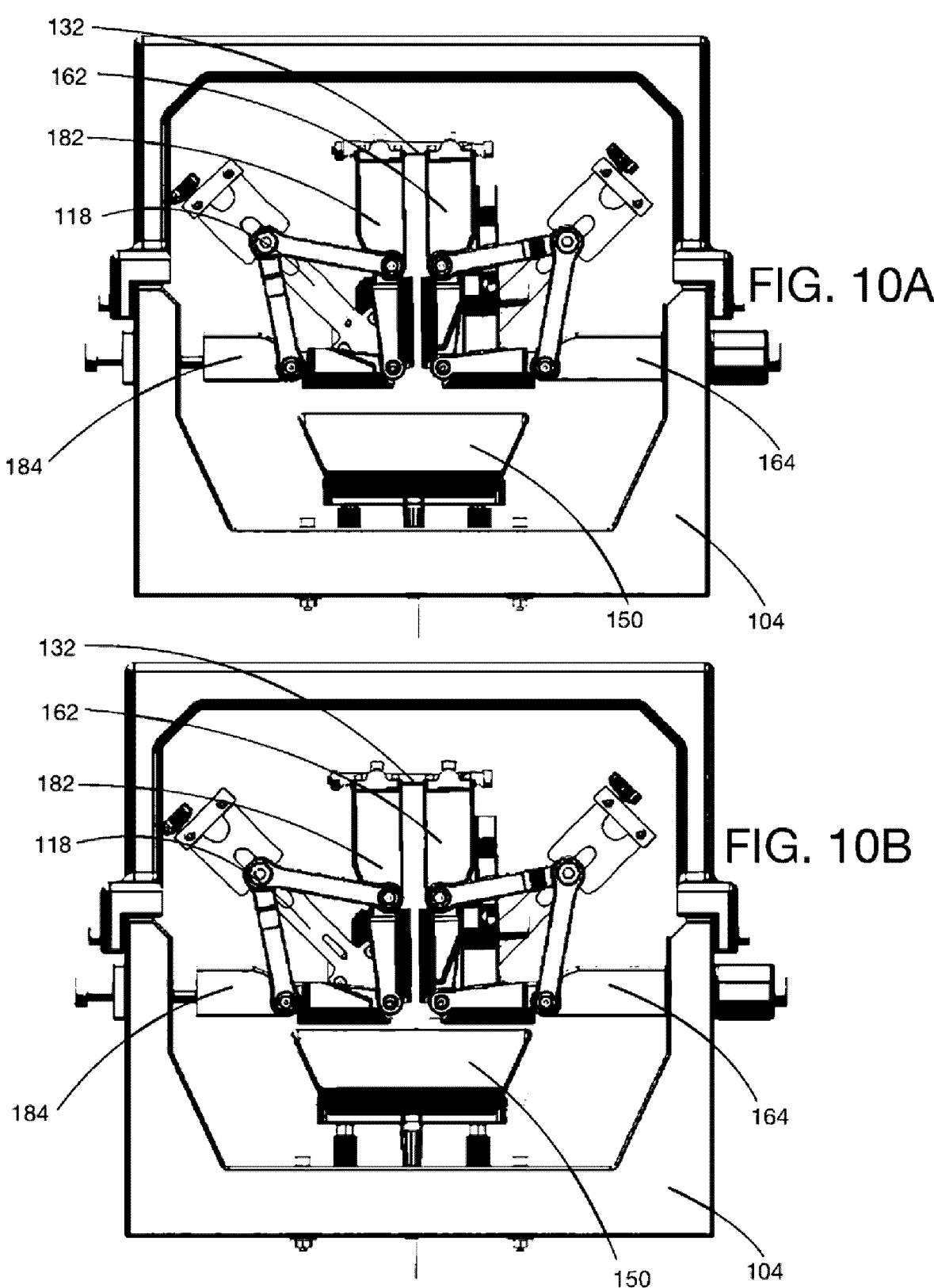
FIG. 10A shows an end view of an NDT apparatus in an expanded position.
FIG. 10B shows an end view of an NDT apparatus in a compressed position.

FIG. 10A and FIG. 10B show two dispositions of an example the apparatus 100 showing a way the third portion 150 can be translatable relative to the medial plane to accommodate various test objects 120. As depicted in FIG. 10A, the apparatus 100 can be in a second wide position to accommodate test objects of greater thickness, such as a greater thickness of the flange 121 of the test object 120. The apparatus can be adjustable to a second narrow position as depicted in FIG. 10B to accommodate test objects of less thickness, such as a lesser thickness of the flange 121. The apparatus 100 can be placed in a plurality of positions accommodating a plurality of flange 121 thicknesses in addition to those depicted in FIG. 10A and FIG. 10B. The apparatus 100 can be placed in a plurality of positions in addition to those depicted in FIGS. 9A, 9B, 10A, and 10B to accommodate objects with varying web 123 and flange 121 thicknesses.

Figure 11A:
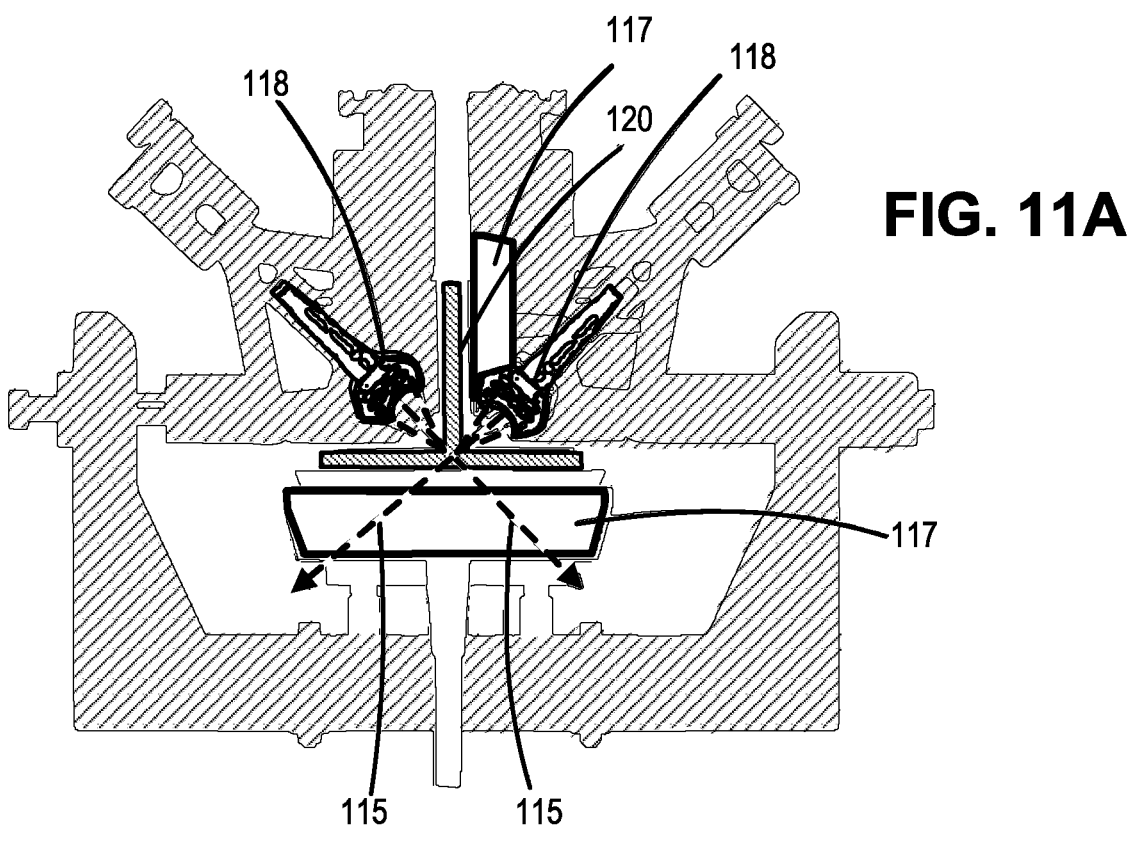
FIG. 11A shows a cross-section view of an NDT apparatus and a corresponding location of a test object.

FIG. 11A, FIG. 11B, FIG. 12A, FIG. 12B, and FIG. 12C show various views of an example of an NDT apparatus in use with several test objects 120 varying in profile. As depicted in FIG. 11A, the apparatus 100 can accommodate a T-shaped test object having with a substantially perpendicular web 123 in relation to the flange 121. The apparatus 100 can orient one or more surface probes 117 to a suitable inspection distance from the web 123, the flange 121 or both. In an example, the third portion 150 can include or use or be mechanically coupled to a surface probe 117. Likewise, one or both of the first opposing surface 162 or second opposing surface 182 can include or use or be mechanically coupled to a surface probe 117. The apparatus can orient the one or more inspection probes 118, each in a suitable direction 115 for inspection of the corner or radius 125 of the test object 120.

Figure 11B:
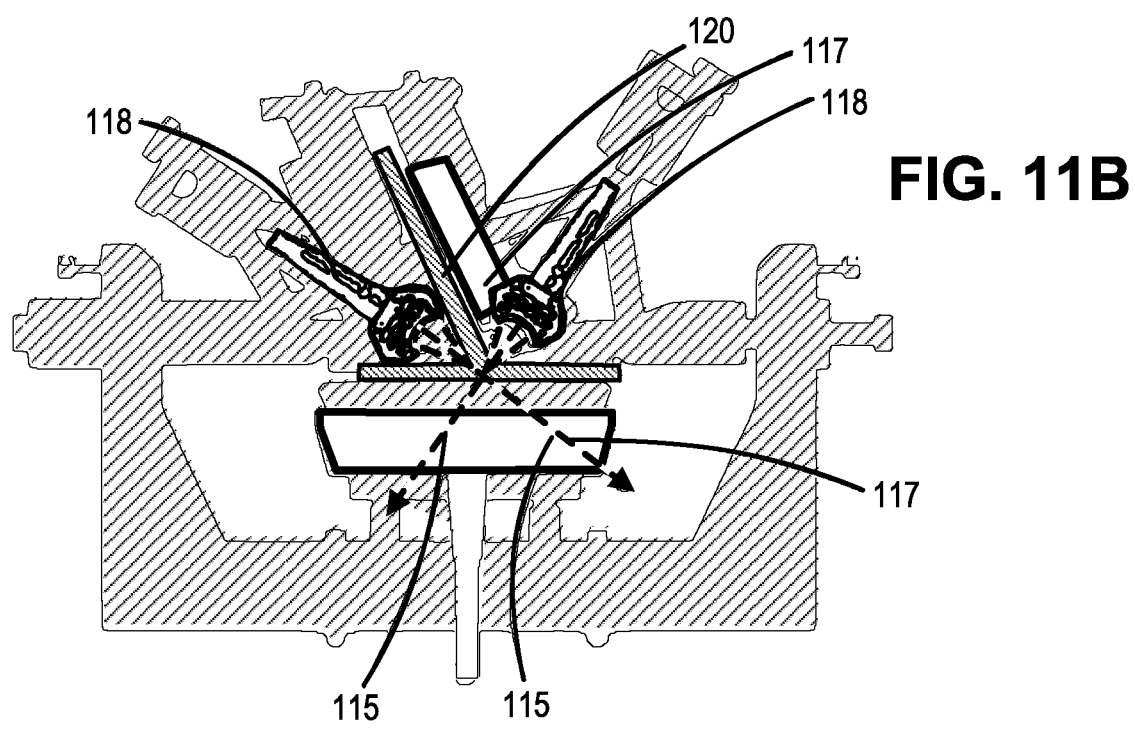
FIG. 11B shows a cross-section view of an NDT apparatus and a corresponding location of a test object.

FIG. 11B shows how an example of the apparatus 100 can accommodate a T-shaped test object 120 with a non-perpendicular web 123. In an example, the surface probe 117 at or near the first opposing portion 162 can rotate or pivot about the reference location 168, the surface probe 117 maintaining a suitable distance from the web 123 for adequate volumetric inspection. Likewise, surface probe 117 at or near the third surface 152 can translate towards the flange 121 of the test object, the surface probe 117 maintaining a suitable distance from the flange 121 for adequate volumetric inspection. The inspection probes 118 can conform to the angle 129 of the test object 120 and thus to be maintained by the apparatus 100 at a suitable orientation with respect to the radius 125. As such, the direction 115 of each probe can remain towards the radius 125 without substantial adjustment, such as manual adjustment by an operator.

Figure 12A:
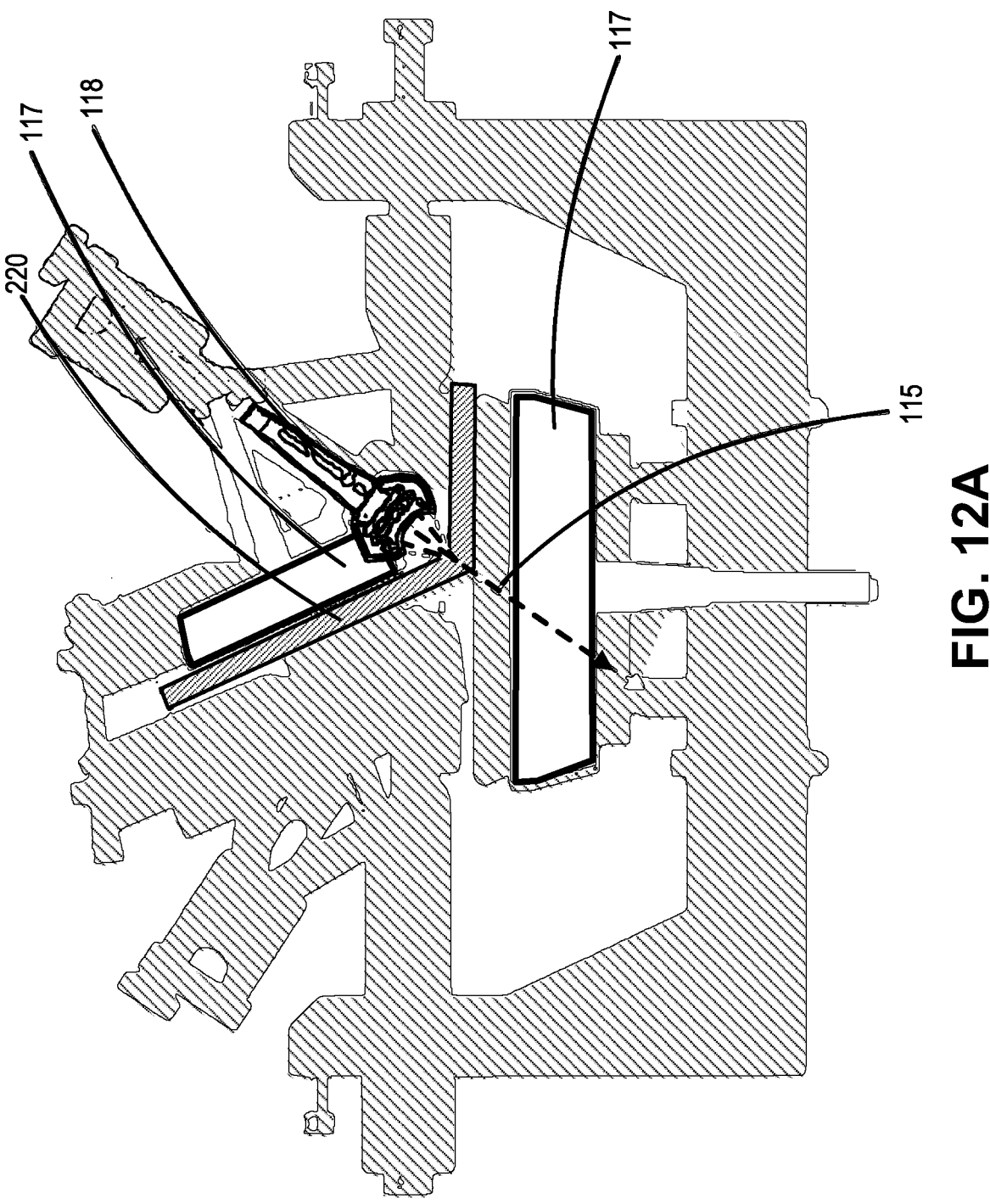
FIG. 12A shows a cross-section view of an NDT apparatus and a corresponding location of a test object.
Figure 12B:
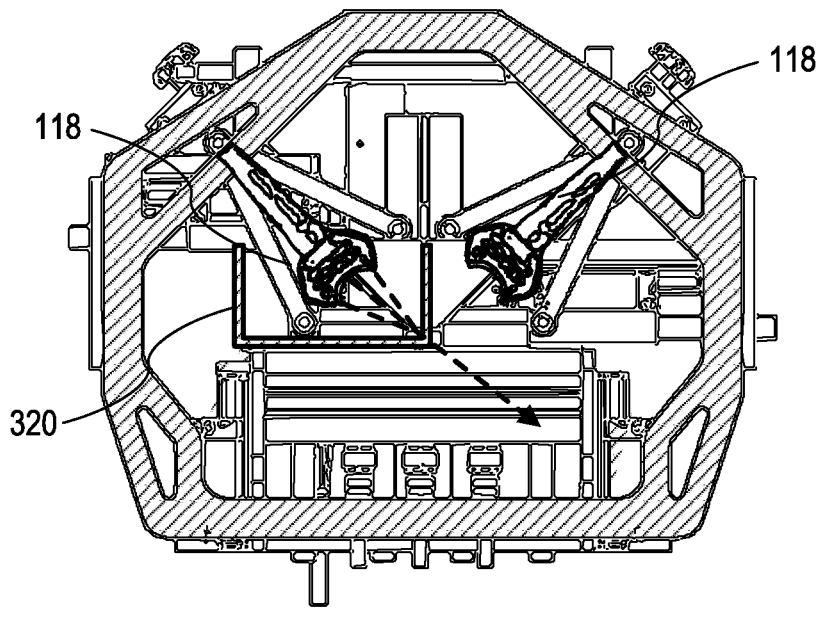
FIG. 12B shows a cross-section view of an NDT apparatus and a corresponding location of a test object.
Figure 12C:
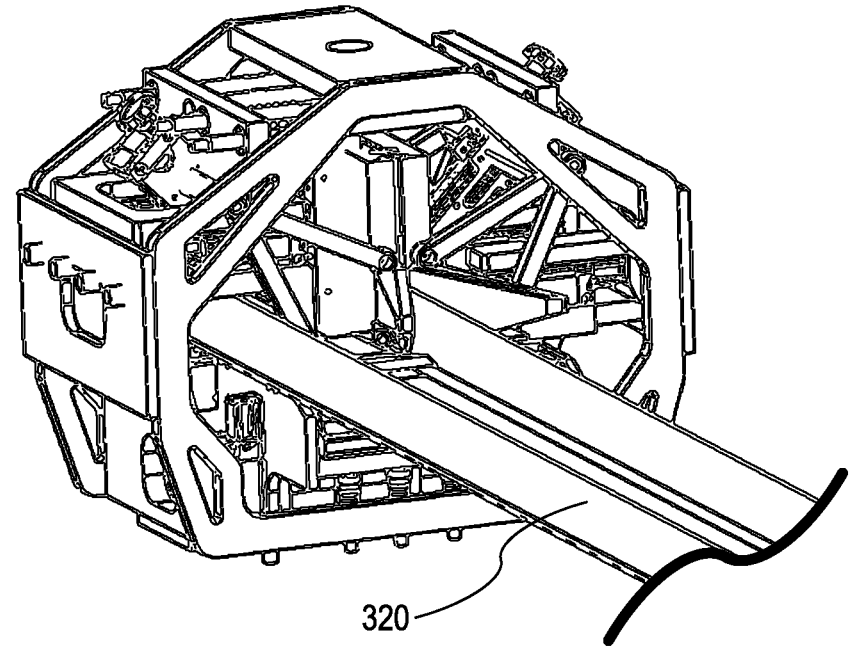
FIG. 12C shows a perspective view of an NDT apparatus and a corresponding location of a test object.

FIG. 12A, FIG. 12B, and FIG. 12C depict the apparatus in use with an L-shaped test object 220 and a U-shaped test object 320, respectively. The apparatus 100 can accommodate both object types 220 and 320 in a similar fashion to what has been described above with respect to the T-shaped test object 120. In an example, the third portion 150 can be translatable laterally away from a medial plane between the first portion 160 and second portion 180. The third portion 150 can be adjusted in such a manner manually or automatically via electric motors, pneumatic or hydraulic cylinders, or other suitable methods of actuation or mechanical movement. As depicted in FIG. 12A, the third portion 150 can translate laterally away from the medial plane in order for the surface probe 117 at or near the third surface 152 to be properly aligned with the flange 221. As depicted in FIG. 12B and FIG. 12C, the joints 325 and 327 (joints depicted in FIG. 1C) of a U-shaped test object 320 can be inspected by the apparatus 100 as inner joints. Testing of a U-shaped test object 320 including two or more inner joints can involve performing a plurality of passes of the test object 320 through the apparatus. Alternatively or additionally, the one or more inspection probes 118 can be arranged such as to concurrently or simultaneously inspect a plurality of inner joints. Also, the inspection probes 118 can be arranged such as to at least partially inspect an outer joint of the test object 320.

In operation and use, the apparatus 100 adaptively adjustable for use with different cross-sectional profiles of a test object 120, such as T-shaped, L-shaped, or U-shaped test objects 120. The apparatus 100 can be passed along the length of the test object 120. Alternatively or additionally, the test object 120 can be fed through the apparatus 100. The test object 120 can be contacted by one or more inlet features 102 in order for the apparatus 100 to conform to the cross-sectional profile of the test object 120. In an example, the test object 120 can be wedged into the apparatus 100 in order for the apparatus 100 to articulate to conform to the test object 120. The apparatus 100 can be passed along the test object in a relatively small number of passes for sufficient volumetric inspection of the test object. In an example, the apparatus 100 can perform full volumetric inspection of the test object 120 in a single pass. In addition to T-shaped, L-shaped, or U-shaped test objects 210, the apparatus 100 can be capable of volumetric inspection of substantially flat elongate objects, substantially round elongate objects, and other similar-shaped test objects.

Notes and Examples

Aspect 1 is a non-destructive test apparatus adaptably configurable for use with different cross-sectional profiles of an object under test, the apparatus comprising: a frame; a first portion mechanically coupled to the frame, the first portion defining a first opposing surface anchored to pivot about a reference location; a second portion mechanically coupled to the frame, the second portion defining a second opposing surface facing the first opposing surface, the second portion movable to provide an adjustable distance between the first opposing surface and the second opposing surface; and at least one probe configured for non-destructive inspection of the object under test when the object under test is located between the first and second opposing surfaces.

In Aspect 2, the subject matter of Aspect 1, further comprising a linkage mechanically coupling the first portion with the second portion, the linkage configured to maintain a specified rotational orientation of the second opposing surface relative to the first opposing surface as the first opposing surface pivots about the reference location.

In Aspect 3, the subject matter of any of Aspects 1-2, comprising at least one tapered inlet feature shaped to accept the object under test and to direct the object under test toward a location between the first and second opposing surfaces.

In Aspect 4, the subject matter of Aspect 3, wherein the at least one tapered inlet feature is included as a portion of an inlet guide comprising opposing tapered inlet features, the opposing tapered inlet features corresponding to the first opposing surface and second opposing surface respectively.

In Aspect 5, the subject matter of any of Aspects 1-4, wherein the second opposing surface is biased toward the first opposing surface to conform to opposite faces of a first planar region of the object under test.

In Aspect 6, the subject matter of any of Aspects 1-5, comprising a third portion defining a third surface to conform to a second planar region of the object under test, the third portion mechanically coupled to the frame.

In Aspect 7, the subject matter of Aspect 6, wherein the third portion is adjustable in at least one direction.

In Aspect 8, the subject matter of any of Aspects 6-7, wherein the third portion is biased toward the first portion and the second portion to conform to the second planar region of the object under test.

In Aspect 9, the subject matter of Aspect 8, wherein the third portion comprises an inspection probe, or is mechanically coupled to an inspection probe, amongst two or more inspection probes among the at least one probe.

In Aspect 10, the subject matter of any of Aspects 8-9, wherein an inspection probe amongst the at least one probe is mechanically coupled to the first portion or the second portion.

In Aspect 11, the subject matter of Aspect 10, wherein the inspection probe amongst the at least one probe can pivot dependent to a rotational orientation of the corresponding first portion or second portion to which the inspection probe is mechanically coupled.

In Aspect 12, the subject matter of any of Aspects 10-11, wherein the inspection probe amongst at least one probe establishes an adjustable distance between a transducer face and the object under test.

In Aspect 13, the subject matter of any of Aspects 10-12, wherein the inspection probe is mechanically coupled to the first portion or the second portion using a scissoring support defined by a first elongate member and a second elongate member each pivotably coupled to the first portion or each pivotably coupled to the second portion.

In Aspect 14, the subject matter of any of Aspects 2-13, wherein the linkage comprises a slide defining a lateral translational axis; wherein the first portion and the second portion are mechanically anchored to the slide in a manner permitting translation of the first portion relative to the second portion along the lateral translational axis.

In Aspect 15, the subject matter of any of Aspects 1-14, wherein the reference location is fixed relative to the frame.

In Aspect 16, the subject matter of any of Aspects 1-15, wherein the frame comprises a mating feature to receive a portion of a robotic manipulator.

In Aspect 17, the subject matter of any of Aspects 1-16, wherein the frame, the first portion, the second portion, and the at least two inspection probes are submersible.

In Aspect 18, the subject matter of any of Aspects 1-17, further comprising a robotic manipulator mechanically coupled to the frame and configured to at least one of rotate or translate the frame to position the first portion and the second portion relative to the object under test.

In Aspect 19, the subject matter of any of Aspects 1-18, further comprising a test processing unit communicatively coupled with the at least two inspection probes, the test processing unit comprising a memory circuit comprising instructions that, when executed by at least one processor circuit, cause the test processing unit to perform an inspection operation using at least one of the at least two inspection probes.

In Aspect 20, the subject matter of any of Aspects 1-19, wherein the at least two inspection probes comprise acoustic inspection probes.

In Aspect 21, the subject matter of any of Aspects 1-20, wherein the at least two inspection probes comprise eddy current inspection probes.

Aspect 22 is a method for adaptively adjusting a non-destructive test apparatus for use with different cross-sectional profiles of an object under test, the method comprising: receiving the object under test by relative motion of the object under test with respect to the non-destructive test apparatus; and adjusting at least one of (1) a distance between a first opposing surface and a second opposing surface, or (2) a rotational orientation of the first opposing surface and the second opposing surface of the non-destructive test apparatus to accommodate a profile of the object under test; wherein the non-destructive test apparatus comprises: a first portion mechanically coupled to a frame of the apparatus, the first portion defining the first opposing surface anchored to pivot about a reference location; and a second portion mechanically coupled to the frame, the second portion defining the second opposing surface facing the first opposing surface, the second portion movable to provide an adjustable distance between the first opposing surface and the second opposing surface.

In Aspect 23, the subject matter of Aspect 22, maintaining, via a linkage mechanically coupling the first portion with the second portion, a specified rotational orientation of the second opposing surface relative to the first opposing surface as the first opposing surface pivots about the reference location.

In Aspect 24, the subject matter of any of Aspects 22-23, further comprising: feeding the object under test to be accepted through an inlet; and directing the object under test toward a location between the first and second opposing surfaces.

In Aspect 25, the subject matter of any of Aspects 22-24, comprising biasing the second opposing surface toward the first opposing surface to conform to opposite faces of a first planar region of the object under test.

In Aspect 26, the subject matter of any of Aspects 22-25, comprising shifting, via a mechanical actuator or bias, a third portion defining a third surface toward a second planar region of the object under test, the third portion mechanically coupled to the frame.

In Aspect 27, the subject matter of any of Aspects 25-26, comprising biasing a third portion defining a third surface toward the first portion and the second portion to conform to the second planar region of the object under test.

In Aspect 28, the subject matter of Aspect 27, comprising mechanically coupling an inspection probe to the third portion.

In Aspect 29, the subject matter of any of Aspects 27-28, comprising mechanically coupling an inspection probe to the first portion or the second portion.

In Aspect 30, the subject matter of Aspect 29, comprising pivoting the inspection probe dependent to a rotational orientation of the corresponding first portion or second portion to which the inspection probe is mechanically coupled.

In Aspect 31, the subject matter of any of Aspects 29-30, comprising shifting the inspection probe toward a transducer face and the object under test.

In Aspect 32, the subject matter of any of Aspects 29-31, comprising mechanically coupling the inspection probe to the first portion or the second portion using a scissoring support defined by a first elongate member and a second elongate member each pivotably coupled to the first portion or each pivotably coupled to the second portion.

In Aspect 33, the subject matter of any of Aspects 23-32, comprising: mechanically anchoring the first portion and the second portion to a slide in a manner permitting translation of the first portion relative to the second portion along a lateral translational axis; wherein the linkage includes the slide and the length of the slide defines the lateral translational axis.

In Aspect 34, the subject matter of any of Aspects 22-33, wherein the reference location is fixed relative to the frame.

In Aspect 35, the subject matter of any of Aspects 22-34, wherein the frame comprises a mating feature to receive a portion of a robotic manipulator.

In Aspect 36, the subject matter of any of Aspects 22-35, wherein the frame, the first portion, and the second portion are submersible.

In Aspect 37, the subject matter of any of Aspects 22-36, comprising mechanically coupling a robotic to the frame and configured to at least one of rotate or translate the frame to position the first portion and the second portion relative to the object under test.

In Aspect 38, the subject matter of any of Aspects 22-37, further comprising communicatively coupling a test processing unit with at least two inspection probes mechanically coupled to the apparatus; and performing, via the test processing unit, an inspection operation using at least one of the at least two inspection probes.

In Aspect 39, the subject matter of any of Aspects 22-38, comprising including or using an acoustic inspection probe.

In Aspect 40, the subject matter of any of Aspects 22-39, comprising including or using an eddy current inspection probe.

Aspect 41 is at least one machine-readable medium including instructions that, when executed by processing circuitry, cause the processing circuitry to perform operations to implement of any of Aspects 1-40.

Aspect 42 is an apparatus comprising means to implement of any of Aspects 1-40.

Aspect 43 is a system to implement of any of Aspects 1-40.

Aspect 44 is a method to implement of any of Aspects 1-40.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein. In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment.

What is claimed is:

1. A non-destructive test apparatus adaptably configurable for use with different cross-sectional profiles of an object under test, the apparatus comprising:
   a frame;
   a first portion mechanically coupled to the frame, the first portion defining a first opposing surface anchored to pivot about a reference location;
   a second portion mechanically coupled to the frame, the second portion defining a second opposing surface facing the first opposing surface, the second portion movable to provide an adjustable distance between the first opposing surface and the second opposing surface;
   at least one probe configured for non-destructive inspection of the object under test when the object under test is located between the first and second opposing surfaces; and
   a linkage mechanically coupling the first portion with the second portion, the linkage configured to maintain a specified rotational orientation of the second opposing surface relative to the first opposing surface as the first opposing surface pivots about the reference location,
   wherein the linkage comprises a slide defining a lateral translational axis; and
   wherein the first portion and the second portion are mechanically anchored to the slide in a manner permitting translation of the first portion relative to the second portion along the lateral translational axis.

2. The non-destructive test apparatus of claim 1, comprising at least one tapered inlet feature shaped to accept the object under test and to direct the object under test toward a location between the first and second opposing surfaces.

3. The non-destructive test apparatus of claim 2, wherein the at least one tapered inlet feature is included as a portion of an inlet guide comprising opposing tapered inlet features, the opposing tapered inlet features corresponding to the first opposing surface and second opposing surface respectively.

4. The non-destructive test apparatus of claim 1, wherein the second opposing surface is biased toward the first opposing surface to conform to opposite faces of a first planar region of the object under test.

5. The non-destructive test apparatus of claim 1, comprising a third portion defining a third surface to conform to a second planar region of the object under test, the third portion mechanically coupled to the frame.

6. The non-destructive test apparatus of claim 5, wherein the third portion is adjustable in at least one direction, wherein the third portion is biased toward the first portion and the second portion to conform to the second planar region of the object under test, and wherein the third portion comprises an inspection probe, or is mechanically coupled to the inspection probe, amongst two or more inspection probes among the at least one probe.

7. The non-destructive test apparatus of claim 1, wherein an inspection probe amongst the at least one probe is mechanically coupled to the first portion or the second portion.

8. The non-destructive test apparatus of claim 7, wherein the inspection probe amongst the at least one probe can pivot dependent to a rotational orientation of the corresponding first portion or second portion to which the inspection probe is mechanically coupled.

9. The non-destructive test apparatus of claim 8, wherein the inspection probe amongst at least one probe establishes an adjustable distance between a transducer face and the object under test.

10. The non-destructive test apparatus of claim 9, wherein the inspection probe is mechanically coupled to the first portion or the second portion using a scissoring support defined by a first elongate member and a second elongate member each pivotably coupled to the first portion or each pivotably coupled to the second portion.

11. The non-destructive test apparatus of claim 1, comprising:

a linkage mechanically coupling the first portion with the second portion, the linkage configured to maintain a specified rotational orientation of the second opposing surface relative to the first opposing surface as the first opposing surface pivots about the reference location;

wherein the reference location is fixed relative to the frame.

12. The non-destructive test apparatus of claim 1, wherein the frame comprises a mating feature to receive a portion of a robotic manipulator.

13. The non-destructive test of apparatus of claim 1, comprising a robotic manipulator mechanically coupled to the frame and configured to at least one of rotate or translate the frame to position the first portion and the second portion relative to the object under test.

14. The non-destructive test apparatus of claim 1, comprising a test processing unit communicatively coupled with the at least two inspection probes, the test processing unit comprising a memory circuit comprising instructions that, when executed by at least one processor circuit, cause the test processing unit to perform an inspection operation using at least one of the at least two inspection probes.

15. A method for adaptively adjusting a non-destructive test apparatus for use with different cross-sectional profiles of an object under test, the method comprising:

receiving the object under test by relative motion of the object under test with respect to the non-destructive test apparatus; and adjusting at least one of (1) a distance between a first opposing surface and a second opposing surface, or (2) a rotational orientation of the first opposing surface and the second opposing surface of the non-destructive test apparatus to accommodate a profile of the object under test;

wherein the non-destructive test apparatus comprises:

a first portion mechanically coupled to a frame of the apparatus, the first portion defining the first opposing surface anchored to pivot about a reference location;

a second portion mechanically coupled to the frame, the second portion defining the second opposing surface facing the first opposing surface, the second portion movable to provide an adjustable distance between the first opposing surface and the second opposing surface;

maintaining, via a linkage mechanically coupling the first portion with the second portion, a specified rotational orientation of the second opposing surface relative to the first opposing surface as the first opposing surface pivots about the reference location; and mechanically anchoring the first portion and the second portion to a slide in a manner permitting translation of the first portion relative to the second portion along a lateral translational axis, wherein the linkage includes the slide and a length of the slide defines the lateral translational axis.

16. The method of claim 15, comprising biasing the second opposing surface toward the first opposing surface to conform to opposite faces of a first planar region of the object under test.

17. The method of claim 15, comprising:

mechanically coupling an inspection probe to the first portion or the second portion; and pivoting the inspection probe dependent to a rotational orientation of the corresponding first portion or second portion to which the inspection probe is mechanically coupled.

* * * * *